July 18, 1967    J. FRIEDMAN    3,331,904
METHOD FOR MAKING PLASTIC BUTTONS
Filed Oct. 10, 1966
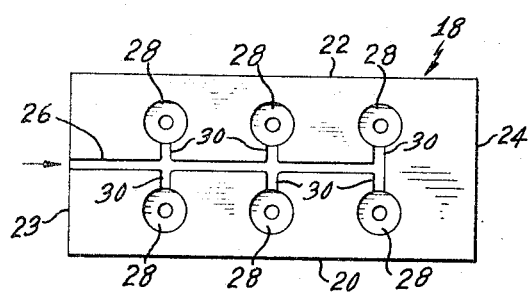
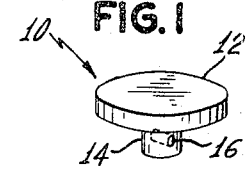
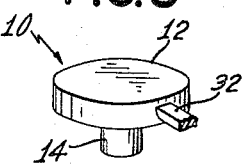
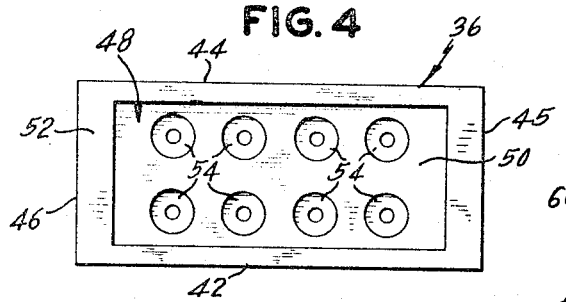
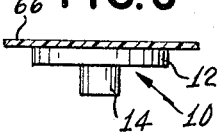
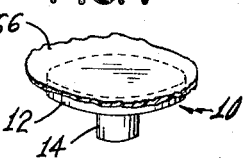
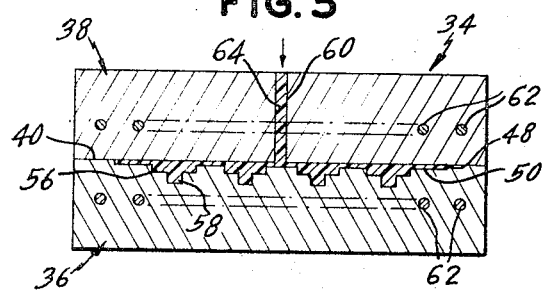
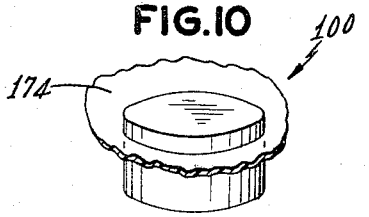
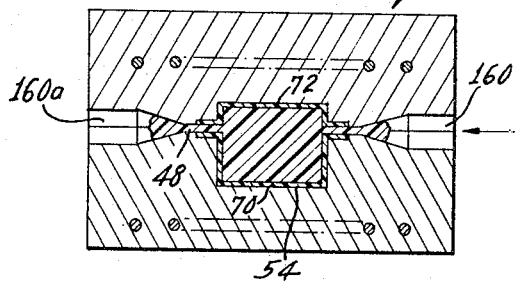
INVENTOR.
Jules Friedman
BY Jerome Bauer
ATTORNEY

United States Patent Office 3,331,904
Patented July 18, 1967

3,331,904
METHOD FOR MAKING PLASTIC BUTTONS
Jules Friedman, 61 Smith St., Lynbrook, N.Y. 11563
Filed Oct. 10, 1966, Ser. No. 594,959
6 Claims. (Cl. 264—108)

This application is a continuation-in-part of co-pending application Ser. No. 447,418, filed Apr. 12, 1965, now abandoned, entitled "Method and Means for Making Plastic Buttons or Similar Articles."

This invention relates to methods of and means for making articles and particularly buttons by the injection molding of a liquid thermosetting resin and the making of such articles and buttons having a sheet by the injection molding of a composition of a liquid thermosetting resin and a light reflecting lamella.

In the plastics industry and, in particular, the plastic button making industry, it has been common practice to add so-called pearl essence or "Lamellae" to the plastic batch to impart an integral sheen to the finished product. The pearl essence is essentially an elongated strip having a central longitudinal axis. To impart the desired opalescent properties to the plastic article, it is necessary that the pearl essence be oriented so the longitudinal axis lies in a horizontal rather than a vertical plane. Conventionally, such articles or, in the present illustrative example, buttons were produced by a compression molding process. The compression molding process caused turbulent movement of the liquid resin prior to its curing in the mold, thereby causing the pearl essence to orient itself in the desired position so the molded product exhibited the required sheen.

More particularly, a compression molding process includes the insertion of a thermosetting plastic compound containing the lamellae therein into an open, heated mold cavity, closing the mold, and applying pressures. Some of the temperature of the mold is absorbed by the thermosetting resinous material that becomes "polymerized" or cured. Thereafter, the finished articles are removed from the mold. However, it is obvious that compression molding processes suffer from inherent disadvantages in that they are time consuming, extremely cumbersome and uneconomical.

Accordingly, it is an object of the present invention to provide a method for the rapid, inexpensive injection molding of plastic articles including articles made of a liquid thermosetting resinous material that may have a light reflecting lamella contained therein.

It is a further object of the present invention to provide a mold for the injection molding of a composition of a liquid thermosetting resin containing a light reflecting lamella to mold articles, particularly buttons, having an integral sheen.

Other and further objects of this invention reside in the structures and arrangements hereinafter more fully described with reference to the accompanying drawing in which:

FIG. 1 is a perspective view of the button made in accordance with the method of the present invention, FIG. 2 is a top plan view of the lower portion of a prior art mold utilized for the injection molding of buttons, FIG. 3 is a perspective view of a button produced from the mold illustrated in FIG. 2, FIG. 4 is a top plan view of the bottom section of a mold made in accordance with the present invention, FIG. 5 is a vertical sectional view of the complete mold of the present invention, FIG. 6 is a front elevation view of a plastic button produced from the mold illustrated in FIG. 4 prior to the finishing step of the present method, FIG. 7 is a perspective view of the button illustrated in FIG. 6, FIG. 8 is a vertical cross-section of a mold illustrating an embodiment of the invention, FIG. 9 is a vertical cross-section of a mold illustrating still another embodiment, and FIG. 10 is a perspective view of an article made according to the mold of FIG. 9.

The method and mold of the present invention will be described in conjunction with the manufacture of a plastic pearl essence button of the type illustrated in FIG. 1. Thus, the button, generally identified by the numeral 10, comprises a circular head portion 12 and an integral shank portion 14 which depends from the undersurface of the head and is coaxial therewith. A transverse bore 16 extends through the shank 14 adjacent the lower edge thereof and is adapted to receive threads therethrough when the button is sewn to a garment. The plastic button 10, as noted below, contains pearl essence therein to impart an integral sheen to the external surfaces of the button. Albeit the plastic article described and shown herein is a button, the present invention is not to be limited to this particular article but it is equally applicable to the manufacture of similar plastic articles.

In order to eliminate the disadvantages associated with compression molding of plastic articles containing lamellae therein, it has been suggested to produce the articles by an injection molding process. As is well known in the art, an injection molding process includes supplying the thermoplastic and lamella in powdered form to an injection cylinder through a "feed hopper." The cylinder is heated to change the powder into a plastic melt and a piston or a screw within the cylinder forces the plastic melt into a mold through an appropriate nozzle connected to the injection cylinder. However, as will become apparent from a consideration of the following discussion, these prior art injection molds and methods were completely unsuitable for the manufacture of plastic pearl essence buttons.

The lower section, generally identified by the numeral 18, of a prior art type of injection mold, is illustrated in FIG. 2 and includes a front wall 20, a rear wall 22, and side walls 23 and 24. A centrally located runner 26 extends between the side walls of section 18, beginning at wall 24 and terminating at a point spaced from wall 23. A row of shaped cavities 28 are respectively positioned between runner 26 and rear wall 22 and a similar row of shaped cavities 28 are positioned between runner 26 and front wall 20. Each of the cavities 28 is connected to runner 26 by a respective gate 30.

In prior art operations, the powdered plastic pearl essence resin is forced under pressure into the complete mold by injection molding techniques, as described above, whereby the plastic material runs longitudinally along runner 26 and laterally outwardly along gates 30 into cavities 28 to thereby fill the cavities. After the molded resin is cooled sufficiently, the articles are removed from the cavities, they remain interconnected by the plastic arms which filled runner 26 and gates 30. However, when the articles are separated from each other as by breaking them from their respective gates 30, a portion of the plastic material filling gates 30 remains as an integral ragged lateral projection 32 which is connected to the circumferential peripheral wall of the article, as shown in FIG. 3. It is obvious that this projection is extremely difficult to remove, especially from the head 12 of a button article 10 while still attempting to retain the circular shape at the head portion, particularly from an article made of a thermosetting resin.

In accordance with the present invention, a mold is provided with a chamber therein. A plurality of button-shaped cavities are provided in the bottom wall of the chamber and a sprue hole communicates with the chamber. The liquid thermosetting resin is introduced into the chamber by causing it to flow under pressure and the liquid resinous material fills the chamber and, of necessity, the cavities in the bottom wall of the chamber. The resinous material is then subjected to an elevated temperature for curing. When the article is cured, it is removed from the mold, the excess resinous material is removed from the mold with it. This excess material or "flashing" can easily be removed in a tumbler, in a head grinding machine or any other suitable machine. Moreover, the chamber will make the liquid resinous material flow into the mold cavity. This flow is desirable and advantageous because it causes the light reflecting lamallae to become oriented and thereby results in producing an integral sheen in the cured article. Hence, by utilizing the mold and method of the present invention, a finished molded article having integral sheen may be produced by an injection molding technique using a liquid thermosetting resin that may include a light reflecting lamella, if integral sheen is desired.

More particularly, the invention comprises an injection mold generally identified by the numeral 34 and as shown in FIGS. 4 and 5. The mold 34 comprises a lower section generally identified by the numeral 36 and an upper section generally identified by the numeral 38. Each section 36 and 38 is separable from the other along a parting plane 40. The lower section 36 includes a front wall 42, a rear wall 44, and side walls 45 and 46. A flashing area or chamber 48, a wall of which may be defined along the parting plane 40, may be provided in either one of the sections 36 or 38. The flash area or chamber is illustrated in exaggerated size in the drawing and includes a bottom wall 50 that is shown defined in one of the mold sections below the parting plane 40. In the preferred embodiment, this height may be in the order of a few thousandths of an inch. The flash area or chamber 48 is shown closed in from and encompassed by the respective front wall 42, rear wall 44, and side walls 45 and 46 of section 36 by a continuous shallow marginal lip 52.

Bottom wall 50 of chamber 48 surrounds and encompasses and is in full peripheral communication with a plurality of rows of downwardly extending article forming button-shaped cavities 54. Each of the button forming cavities 54 includes an upper enlarged circular portion 56, corresponding to head 12 of button 10, and a downwardly extending portion 58 of smaller cross-section than portion 56, corresponding to shank 14 of button 10.

As shown in FIG. 5, the top section 38 is adapted to be received on the bottom section 36 to open and close the mold 34. Section 38 is shown provided with a sprue hole 60 which extends through section 38 and communicates with chamber 48. The location of the sprue may be varied as will appear in a later embodiment to be described. Section 38 may also be provided with vent holes (not shown) in the conventional manner.

The sections 36 and 38 may be provided with heating means 62 to heat the mold and its article forming cavity or cavities. In operation, the mold 34 is assembled with the sections thereof closed to form a closed mold, essentially closed mold cavities, and flash area or chamber. The sprue 60 is connected with a source of supply of a composition of a liquid thermosetting resin that may or may not contain a light reflecting lamella, depending upon whether the molded article is to have an integral sheen. The thermosetting resinous composition is introduced in liquid form into the mold 34 at the sprue hole 60. The liquid thermosetting resin is numbered 64 in FIG. 5 and is caused to flow under pressure into the chamber 48 which effectively forms a large gate that is in full peripheral contact with each of the button cavities 54. The pressurized flow of the resinous composition insures that the plastic will reach each portion of each of the cavities, through their full peripheral communication with the chamber 48. This turbulent flow of the liquid resin is helpful in obtaining the desired horizontal orientation of the longitudinal axis of the lamellae when the same is included in the resinous composition. The provision of chamber 48 is therefore, twofold: to quickly conduct and admit the liquid thermosetting resinous composition to each of the cavities along a portion of their heights and about their full peripheries rather than at a point in their sides; and to introduce lamellae orientation by turbulence resulting from the flow of the resin. In practice, the closed mold 54 is heated while the liquid thermosetting resinous composition is being supplied to it. Hence, so too are the cavities therein. The degree of heat may be varied. However, the heat will be above room temperature to speed up production and curing of the resin.

After the plastic resin has set sufficiently such that it no longer is viscous, it may be said to be cured. Sections 36 and 38 may be separated along the parting plane 40 and the molded article removed therefrom. Thus, if there is more than one button forming cavity 40, the molded articles will appear as a plurality of buttons interconnected by a single flashing which encompasses and forms a peripheral communicating extension across the heads of the buttons as seen in FIGS. 6 and 7, rather than being connected by a plurality of gates, each of which interconnects or protrudes as just a point 32 from the side or the peripheral wall of each of the buttons as in FIG. 3. Since the flashing need be only a few thousandths of an inch thick, equal to the height of the flash area or chamber 48, the buttons 10 may be separated from each other by tearing them apart along the flashing.

A button 10, separated in the foregoing manner, is illustrated in FIGS. 6 and 7 and comprises, in part, the head 12 and depending shank 14. However, integral head portion 12 will contain a portion 66 of the flashing overlying and projecting beyond the circumferential peripheral wall of the head of the button 10. Since the flashing is on the top or head of the button 10, the button is then able to be placed in a tumbler and the flashing tumbled smoothly off. This results in providing a molded article, as a plastic button containing pearl essence or oriented light reflecting lamellae therein, to produce an integral sheen which is manufactured by an injection molding process using a liquid thermosetting resin.

Referring to FIG. 8 of the drawing, the injection mold 34 thereshown includes the lower and upper mold sections 36 and 38. However, the embodiment of FIG. 8 illustrates the use of a flexible parting membrane 70 that may be placed in position between the two mold sections 36 and 38 when the same are closed together. The parting membrane 70 may preferably be a thin sheet of polyvinylchloride that is adapted to cover at least a portion of each of the mold cavities 54. Hence, when the liquid thermosetting resin 64 is introduced into the injection mold 34 by way of the sprue hole 60, the pressure of such resin against the membrane 70 will cause the same to flex and mold itself into and fit conformingly about the walls of the mold cavities 54, thereby covering the same and preventing direct contact of the resinous material 64 with the walls of the cavities. In consequence, after the resinous material 64 is set, the mold 34 may be opened and the molded articles removed therefrom. In such case, the covering membrane 70 will permit quick and easy parting and separation of the molded articles from their respective cavities.

In the embodiment shown in FIG. 9, two parting membranes 70 and 72 may be utilized, each being adapted to cover the lower and upper portions of the single mold cavity 54 illustrated in the injection mold generally identified in FIG. 9 by the numeral 134. The injection mold 134 may be likened to that of the injection mold 34 previously described in that the same may include similar structural details including more than just a single cavity as in the exemplary illustration of FIG. 9. In the embodiment shown in FIG. 9, there is shown two sprue or inlet holes 160 and 160a. These sprue holes may be provided on opposite sides of the mold and cavity to permit a more rapid introduction of the liquid thermosetting resin into the flash chamber and cavity 54. On the other hand, one of the holes 160 or 160a may define the sprue while the other may permit the exit or exhaust of air in the form of undesirable bubbles, thereby permitting the formation of a bubble-free molded article.

In the embodiment of FIG. 9, as in all of the embodiments, the flash chamber 48 communicates with the full periphery of the article forming cavity or cavities 54. However, unlike the embodiments shown in FIGS. 5 and 8, the flash chamber 48 is positioned intermediate the ends or the height of the cavity or cavities, thereby resulting in an article such as is shown in FIG. 10. The article illustrated in FIG. 10 is generally identified by the numeral 100 and comprises a flashing 174 that extends about the full periphery of the molded article. The flash results from the resin being permitted to set in the flash area of chamber 48 of the mold 134. The molded article 100 is easily removed from the sections 136 and 138 of the injection mold 134 of FIG. 9, after the same are opened, because of the interposition of the parting covering membranes 70 and 72. When the article 100 is removed from the mold 134, it is removed with and includes the covering membranes 70 and 72 molded integral therewith on opposite sides thereof. The article 100 also has the flashing 174 that may subsequently be removed.

A unique feature of the flash that is deliberately utilized and provided about the full peripheral surface of each cavity is that when a light reflecting lamella is included in the composition of the liquid thermosetting resin, it seems that the lamella automatically becomes oriented to provide a molded article having integral sheen especially in the area of the peripheral surface between the flash and its communication with the molding cavity. This occurs apparently because the resinous composition flows from the flash area into the cavity about the full periphery of the cavity. It is known that such flow induces orientation of the lamellae. Hence, when the flash 174 (FIG. 10) or 66 (FIGS. 6 and 7) is removed from the respective molded articles, that peripheral portion of the molded article from about which the flash is removed will exhibit an oriented appearance of lamellae or integral sheen as it is commonly referred to in the art.

Thus, it is possible to produce a molded article of a composition of a liquid thermosetting resin, which composition may include a light reflecting lamella to produce a molded article with integral sheen. The present invention, therefore, deliberately attempts to form a flash area about the full periphery of the molded article. Such flash area permits a flow of the resinous composition into the article-forming cavity about the periphery thereof and thereby seems to enable automatic orientation of the lamellae at the entry of the resinous composition into the cavity and throughout the cavity such that the resultant article will exhibit integral sheen.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:
1. In a method for molding a product having integral sheen from a composition of liquid thermosetting resin and light reflecting lamellae in an injection mold that is essentially closed and has a first cavity shaped to that of the desired product and a second cavity encircling about the full periphery of the first cavity and in communication therewith, the steps comprising
 supplying the resinous composition and light reflecting lamellae into the essentially closed mold to fill the first cavity,
 orienting the light reflecting lamellae of the composition by creating a flow of an amount of the liquid resinous composition into the first cavity by introducing an amount of the liquid resinous composition into the first cavity in excess of the capacity of the first cavity to initially fill the first cavity with the composition,
 after the first cavity is filled forcing the excess of the composition to flow out of the first cavity into the peripheral second cavity, the created flow of the liquid resinous composition orienting the light reflecting lamellae of the composition in the first cavity and in at least a portion of the second cavity,
 curing the liquid resinous composition in the first and second cavities while the light reflecting lamellae is oriented,
 and removing from the product molded in the first cavity the excess composition cured in the second cavity to form the desired product molded in the first cavity with a periphery having integral sheen.
2. In a method as in claim 1,
 the essentially closed mold having a plurality of the first cavities each being encircled about the periphery thereof by a second cavity.
3. In a method as in claim 2,
 covering portions of the cavities with a parting membrane to separate the cavities from the composition to prevent contact of the composition with the covered portions of the cavities.
4. In a method of molding a product having integral sheen from a liquid thermosetting resinous composition having light reflecting lamella in an essentially closed injection mold which includes a product forming cavity defined at a parting line of the mold,
 supplying the product forming cavity with the liquid thermosetting resinous composition having light reflecting lamellae by injecting the same thereinto,
 filling the cavity with the liquid resinous composition,
 orienting the light reflecting lamellae of the composition by creating a flow in the cavity by injecting an excess amount of the liquid resinous composition into the cavity more than the capacity of the cavity such that the liquid resinous composition flows in the cavity about its defining surfaces and beyond the confines thereof into the area of the parting line of the essentially closed mold to deliberately form a flash about the cavity and extending beyond the confines of the cavity at the parting line so that the flow of the liquid resinous composition results in orientation of the light reflecting lamellae in the cavity and in at least the portion of the flash about the cavity,
 curing the liquid resinous composition in the mold while the light reflecting lamella is in orientation,
 and removing the flash from the cured product so that the light reflecting lamellae at the portions of the product wherein the flash is removed is in orientation and has integral sheen.

5. In a method as in claim 4, the essentially closed mold is provided with a flash chamber at the parting line encircling the periphery of the cavity and flowing an excess of liquid resinous composition into the flash chamber after the composition fills the cavity so that the composition in the flash chamber forms the flash about the periphery of the cavity.

6. In a method as in claim 5, said essentially closed mold having a plurality of said cavities and each being encircled about the periphery thereof by a flash chamber, and flowing the excess amount of resinous composition into said cavities and therebeyond into their flash chambers.

References Cited
UNITED STATES PATENTS

| | | | |
|---|---|---|---|
| 1,810,126 | 6/1931 | Buxholz | 264—328 |
| 2,353,457 | 7/1944 | Goessling | 264—329 |
| 2,410,324 | 10/1946 | Windsor | 18—30 |
| 2,856,635 | 10/1958 | Gerson. | |
| 3,154,618 | 10/1964 | Baer | 264—40 |

ROBERT F. WHITE, *Primary Examiner.*

R. B. MOFFITT, *Assistant Examiner.*